United States Patent
Maple et al.

(10) Patent No.: US 6,694,404 B2
(45) Date of Patent: Feb. 17, 2004

(54) METHOD OF IDENTIFYING DATA WITH SAME TIME STAMPS ON DIFFERENT TRACKS IN STORAGE DEVICE

(75) Inventors: Catharine Anne Maple, Bristol (GB); Jonathan Peter Buckingham, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/917,785

(22) Filed: Jul. 31, 2001

(65) Prior Publication Data

US 2003/0028715 A1 Feb. 6, 2003

(51) Int. Cl.$^7$ ............................................... G06F 12/00
(52) U.S. Cl. .................. 711/111; 711/112; 714/48; 714/52; 714/54; 360/47; 360/49
(58) Field of Search ................... 711/111, 112; 714/48, 714/52, 54; 360/47, 49

(56) References Cited

U.S. PATENT DOCUMENTS 5,465,159 A * 11/1995 Ohashi ........................ 386/123
5,729,408 A * 3/1998 Kikitsu ....................... 360/294.7
6,049,654 A * 4/2000 Furuta et al. .................. 386/95
6,473,561 B1 * 10/2002 Heo ............................ 386/125

* cited by examiner

Primary Examiner—Donald Sparks
Assistant Examiner—Ngoc Dinh (57) ABSTRACT

A data reader is arranged to read data comprising user data 30 and non-user data 32, 34 written across at least two channels of a data-holding medium 10, said data being arranged into a plurality of data items 26 each containing user data and non-user data, with said non-user data holding information relating to said user data, said data reader having a read head 12 for reading a respective said channel of said data-holding medium 10 to generate a data signal 14 comprising said data items, and processing circuitry 250 arranged to receive and process said data signals to identify a set CCPset1 of said data items written at the same time onto different said channels. Identifying a set of data items written at the same time gives rise to the possibility of correcting header information for the data items in a set.

25 Claims, 6 Drawing Sheets

METHOD OF IDENTIFYING DATA WITH SAME TIME STAMPS ON DIFFERENT TRACKS IN STORAGE DEVICE

FIELD OF THE INVENTION

This invention provides an improved data storage device, which may be a tape drive arranged to receive data from a computer, or the like. The invention also provides related methods.

BACKGROUND OF THE INVENTION

An example of a data storage device is the tape drive, which receives user data from computers, particularly, but not exclusively to back-up the user data held on the computer onto a data-holding medium. In such back-up applications it is of prime importance that the user data is retrievable, since generally, this copy is the back-up copy that will only be required if the original has been lost or damaged. Therefore, there is an ongoing need to ensure that back-up data storage devices are as robust and secure as possible.

Once user data has been stored on the data-holding medium it can be held there for long periods. To recover the user data from the data-holding medium the data storage device must read the data-holding medium and regenerate the user data originally stored there. In some devices the user data backed-up on the data-holding medium accounts for only about 40% of the overall information held on the data-holding medium. The remaining 60% of the information is non-user data, such as headers or error detection and correction information that attempts to make the user data as secure as possible.

Therefore, in order to read the user data the storage device must accurately detect which is the user data within all of the information held on the data-holding medium. In view of the amount of information other than user data that is held on the data-holding medium, this can be problematic.

The storage device must also be able to detect and correct as many as possible of the errors which may have occurred in writing the user data to the data-holding medium or reading the user data from it, using the error detection and correction information.

The user data is normally split into discrete items, each item including the user data, the error detection and correction information and a header denoting its position in the writing sequence, a write pass number and header error detection information. If the header is corrupted, the data storage device will be able to detect this, but may not be able to correct it, so that the user data in that data item cannot be recovered. Some known data storage devices are able to correct the header, but not reliably, so that the user data in that data item may not be recovered accurately.

SUMMARY OF THE INVENTION

It is an object of the present invention to detect and then reliably correct errors in the header of a data item, particularly where the storage device writes a set of several data items at the same time on a different channels.

According to a first aspect of the invention, a data reader is arranged to read data comprising user data and non-user data written across at least two channels of a data-holding, medium, said data being arranged into a plurality of data items each containing user data and non-user data, with said non-user data holding information relating to said user data, said data reader having a read head for reading a respective said channel of said data-holding medium to generate a data signal comprising said data items, and processing circuitry arranged to receive and process said data signals to identify a set of said data items written at the same time onto different said channels.

The data reader therefore identifies which of the data items were written at the same time, although they may not appear simultaneously on reading because of misalignment of the write heads on the different channels. Being able to identify such a set of data items gives rise to the possibility of correcting header information for a data item, by using the header information from other data items in the set, as the header information for the data items in a set will be similar.

The processing circuitry preferably defines a predetermined time period, such that all data items received within said time period are identified as being in a set. The time period is chosen so that it accommodates the maximum misalignment of the write heads, Preferably, the time period can be varied, to suit different data storage devices.

Conveniently, the circuitry identifies a set of data items by determining when a predetermined point, :such as the end of each data item is received. Each data item will normally have respective non-user data markers to indicate its start and end.

The processing circuitry may determine the start of each time period by receipt of a predetermined point, such as the end of a single data item or of at least two data items received simultaneously. The data item may be received from a predetermined channel, or more preferably, be the first data item to be received from any of the said channels.

The end of a given time period is preferably determined by the time taken to receive a data item. It may instead be determined by receipt of the start of another data item.

A set of data items may contain data items from some or all of the channels. Preferably, a set of data items contains no more than one data item from any of the channels.

The reader may include a plurality of read heads, each of which is arranged to read a separate channel of data in parallel with one another. In the preferred embodiment the reader comprises 8 read heads, although the reader could comprise any number of read heads. For example the reader may comprise 2,3,4,5,6,7,9,10,11,12,13,14, or more read heads. An advantage of providing multiple read heads is that the rate at which data can be read from the data holding medium is increased According to a second aspect of the invention, we provide a data storage device incorporating a data reader according to the first aspect of the invention.

In the preferred embodiment the data storage device is a tape drive. Such a tape drive may be arranged to read data held in any of the following formats: LTO (Linear Tape Open), DAT (Digital Audio Tape), DLT (Digital Linear Tape), DDS (Digital Data Storage), or any other format, although in the preferred embodiment the tape is LTO format.

Alternatively, the data storage device may be any one of the following: CDROM drive, DVD ROM/RAM drive, magneto optical storage device, hard drive, floppy drive, or any other form of storage device suitable for storing digital data, According to a third aspect of the invention, we provide a method of reading data comprising user data and non-user data written across at least two channels of a data-holding mediums said data being arranged into a plurality of data items each containing user data and non-user data, with said non-user data holding information relating to said user data, said method comprising:

reading each said channel of said data-holding medium;

generating a data signal comprising said data items for each channel; and processing said data signals to identify a set of said data items written at the same time onto different said channels.

The method enables identification of the data items written at the same time, although they may not appear simultaneously on reading, because of misalignment of the write heads on the different channels. Being able to identify such a set of data items gives rise the possibility of correcting header information for a data item, by using the header information from other data items in the set, as the header information for the data items in a set will be similar.

The step of processing the data signals preferably includes defining a time period, such that all data items received within said time period are identified as a set. This time period is chosen to accommodate the maximum misalignment of the heads. The step includes identifying a predetermined point, such as the end of a data item, to determine when it is received.

The step of processing the data signals includes identifying the start of each time period by receipt of a predetermined point, such as the end of a single data item from any given channel or of at least two data items simultaneously from different channels. The step also includes determining the end of the time period by the time taken to receive a data item, or the receipt of the start of another data item.

According to a fourth aspect of the invention there is provided a computer readable medium having stored therein instructions for causing a processing unit to execute the method of the third aspect of the invention.

The computer readable medium, although not limited to, may be any one of the following: a floppy disk, a CDROM, a DVD ROM/RAM, a ZIP™ disk, a magneto optical disc, a hard drive, a transmitted signal (including an internet download, file transfer, etc.).

BRIEF DESCRIPTION OF THE DRAWINGS

An embodiment of the invention is described by way of example only in the accompanying drawings, in which.

DETAILED DESCRIPTION OF THE INVENTION

Figure 1:
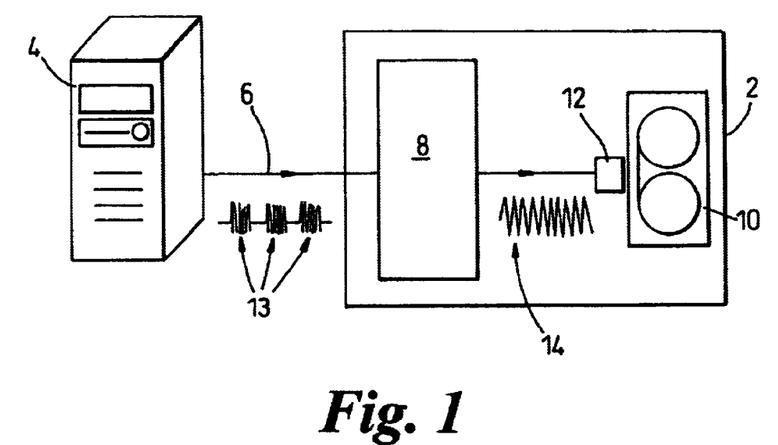
FIG. 1 is a schematic diagram of a computer connected to a tape drive according to the present invention.

Turning to FIG. 1, a tape drive 2 is shown connected to a computing device 4. The computing device 4 may be any device capable of outputting data in the correct format to the tape drive 2, but would typically be a device such as a computer referred to as a PC, an APPLE MAC™, etc These machines may run a variety of operating systems such as for example MICROSOFT WINDOWS™, UNIX, LINUX, MAC OS™, BEOS™. Generally, because of the high cost of the tape drive 2 it would be connected to a high value computer such as a network server running WINDOWS NT™ or UNIX.

A connection 6, in this case a SCSI link, is provided between the computing device 4 and the tape drive 2, which allows data to be transferred between the two devices. The tape drive 2 contains control circuitry 8, which includes a buffer capable of receiving and buffering data received from the computing device 2. A tape 16 has been inserted into the tape drive and is capable of having data written thereto and read therefrom by a set of write and read heads 12. In this embodiment there are eight read and eight write beads. The tape drive corresponds to the LTO format and typically receives tapes having a capacity of the order of 100 Gbytes.

The processing circuitry further comprises memory in which data read from the tape is stored whilst it is being decoded, together with electronics that is arranged to read and decode data from the tape 10.

Data sent by such computing devices is generally sent in bursts, which results in packets of data 13 that need to be smoothed in order that they can be sequentially recorded by the tape drive. Therefore, the buffer within the control circuitry 8 buffers these bursts and allows data to be continuously 14 written to the tape 10.

Figure 2:
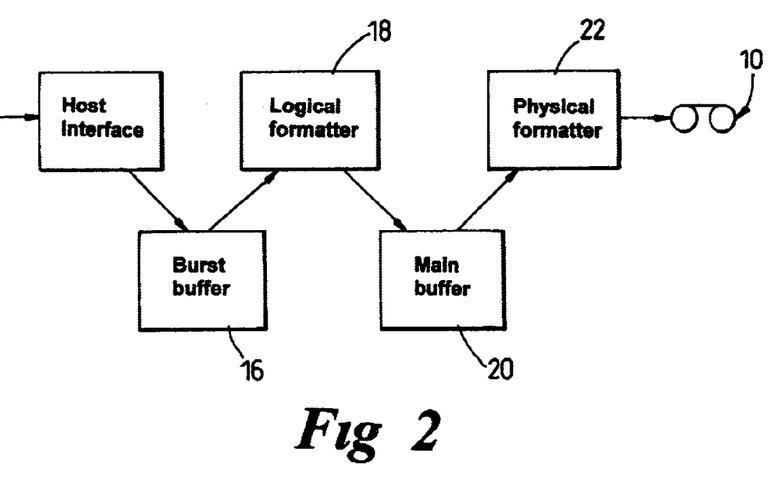
FIG. 2 is a schematic diagram showing the main components of the tape drive of FIG. 1.

The control circuitry is shown in more detail in FIG. 2, which shows a number of portions of the control circuitry 8. The computing device is represented by the left most box of the Figure. The control circuitry 8 comprises a burst buffer 16 that has a capacity of 128 Kbytes and is arranged to receive data from the computing device 4. A logical formatter 18 is provided to perform initial processing of the data received by the burst buffer 16. A main buffer 20 is provided having a capacity of 16 Mbytes and is arranged to hold data that is waiting to be written to the tape 10, and also holds data that is being read from the tape 10 before being sent to the computing device 4. The final block shown in FIG. 2 is the physical formatting block 22, which performs further processing on the data before it can be written to the tape 10, details of which will be given below.

Data received by the tape drive 2 from the computing device 4 is first passed to the burst buffer 16. The burst buffer 16 is required to ensure that the tape drive 2 can receive the high speed bursts of data sent by the computing device 4, which may otherwise be received too rapidly for the logical formatter 18 to process in time. The burst buffer 16 is of a First In First Out (FIFO) nature so that the order of the data is maintained as it is passed to the logical formatter 18.

The logical formatter 18 compresses the data received and arranges it into a first data structure described hereinafter. It is then passed to the main buffer 20, also of a FIFO nature, to await further processing before being written to the tape 10. The capacity of the main buffer 20 is much greater than that of the burst buffer 16 so that it can act as a reservoir of information should data be received from the computing device 4 at too great a rate, and can be used to allow writing to continue should data transmission from the computing device 4 be suspended.

The physical formatter 22 handles the writing of the data to the tape, which includes read while writing retries (RWW retries), generation of first and second levels of error correction (C1 and C2), generation of headers, RLL modulation, sync. fields, and provides data recovery algorithms. These terms will be expanded upon hereinafter.

Figure 3:
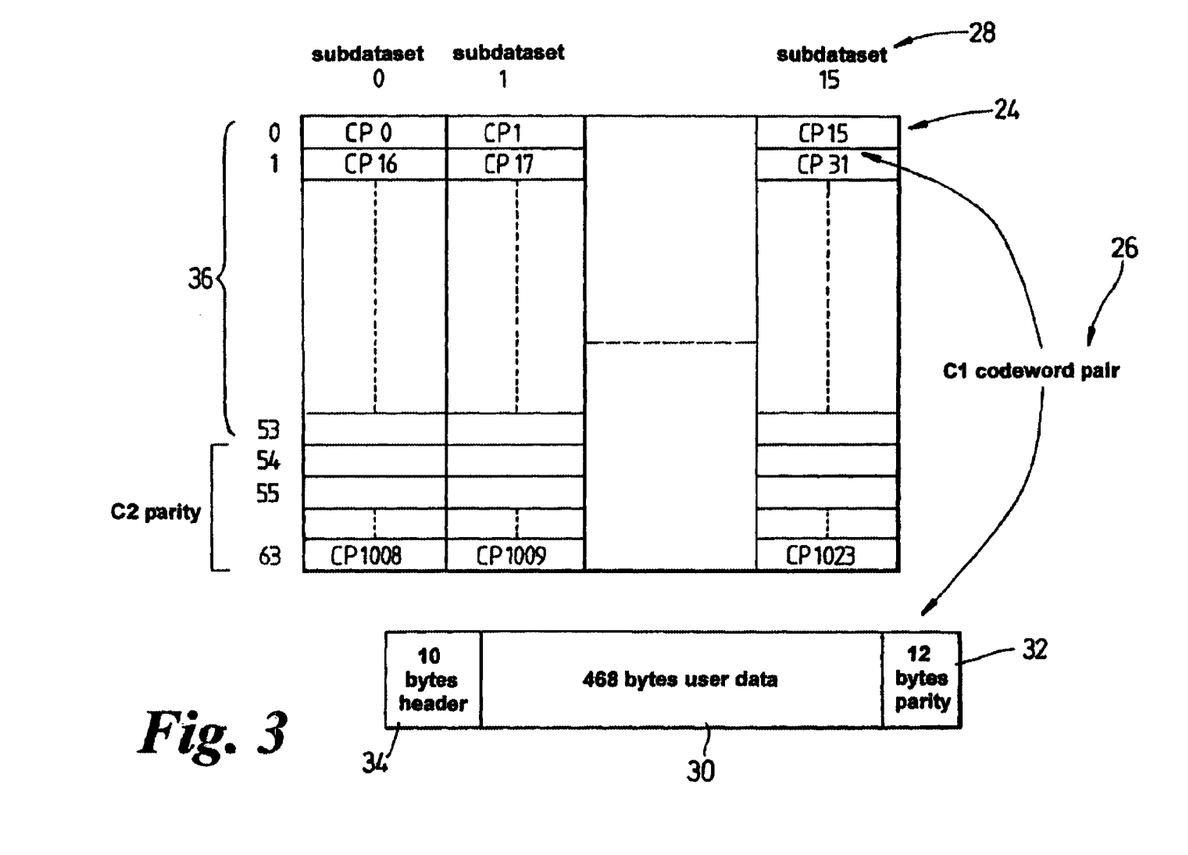
FIG. 3 shows the structure into which data received by the tape drive is arranged.

As written to the tape 10, the data is arranged in a data structure 24, or dataset, as shown in FIG. 3, details of which are as follows. The dataset typically holds 400 Kbytes of compressed data, and comprises a matrix of 64×16 C1 codeword pairs (CCP) 26 and there are therefore 1024 CCPs within a dataset. Each column of the matrix is referred to as a sub-dataset 28, and there are thus 16 sub-datasets within a dataset.

Each CCP, as its name suggests, comprises two code words, each containing 234 bytes of user data, together with 6 bytes of parity information (C1 error correction data), which allows the detection and correction of 3 bytes in error within any CCP. Therefore, each CCP comprises 468 bytes of user data 30 and 12 bytes of parity information 32. The CCP is also headed by a 10 byte header 34.

Rows zero to fifty-three 36 of the dataset 24 hold user data and C1 parity information. Rows fifty-four to sixty-three hold data providing the second level of error correction, C2 parity information.

Figure 4:
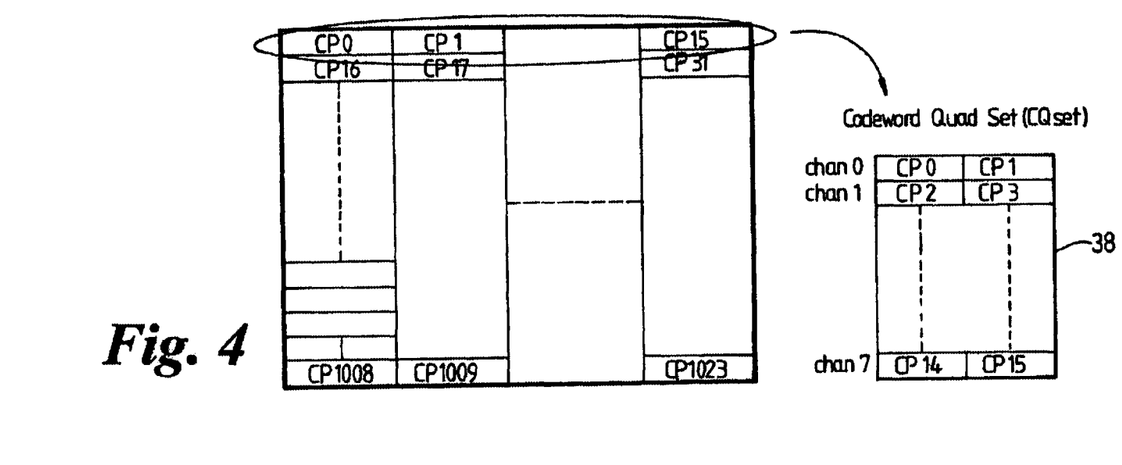
FIG. 4 shows further detain of the data structure of FIG. 3 and how the data is written to the tape.

In general, when the physical formatter 22 writes data to the tape 10 it writes the datasets 24 sequentially, each as a codeword quad set (CQ set) 38, as shown in FIG. 4. This shows that row zero is written first, then row one, up to row 63. Each row is written across all the write heads 12 (channel 0 to channel 7). Each CQ set 38 can be represented as a 2×8 matrix, with each cell of the matrix containing a CCP 26 from the dataset. Each row of the 2×8 matrix is written by a separate write head 12, thus splitting the CQ set 38 across the tape 10.

Figure 5:
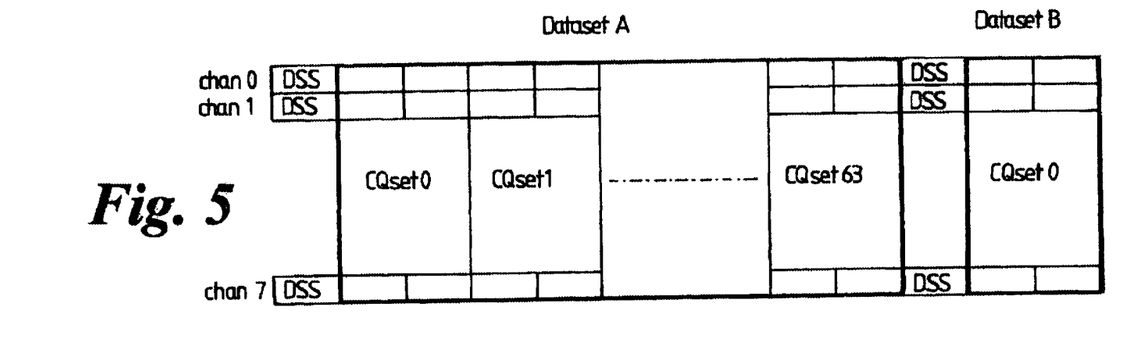
FIG. 5 shows further detail of the data structure of FIGS. 3 and 4, and shows the physical arrangement of the data on the tape.

Thus, the 1024 CCPs 26 from a dataset 24 are written as 64 CQ sets, as shown in FIG. 5. Between each dataset, a dataset separator (DSS) is recorded on the tape 10.

Figure 6:
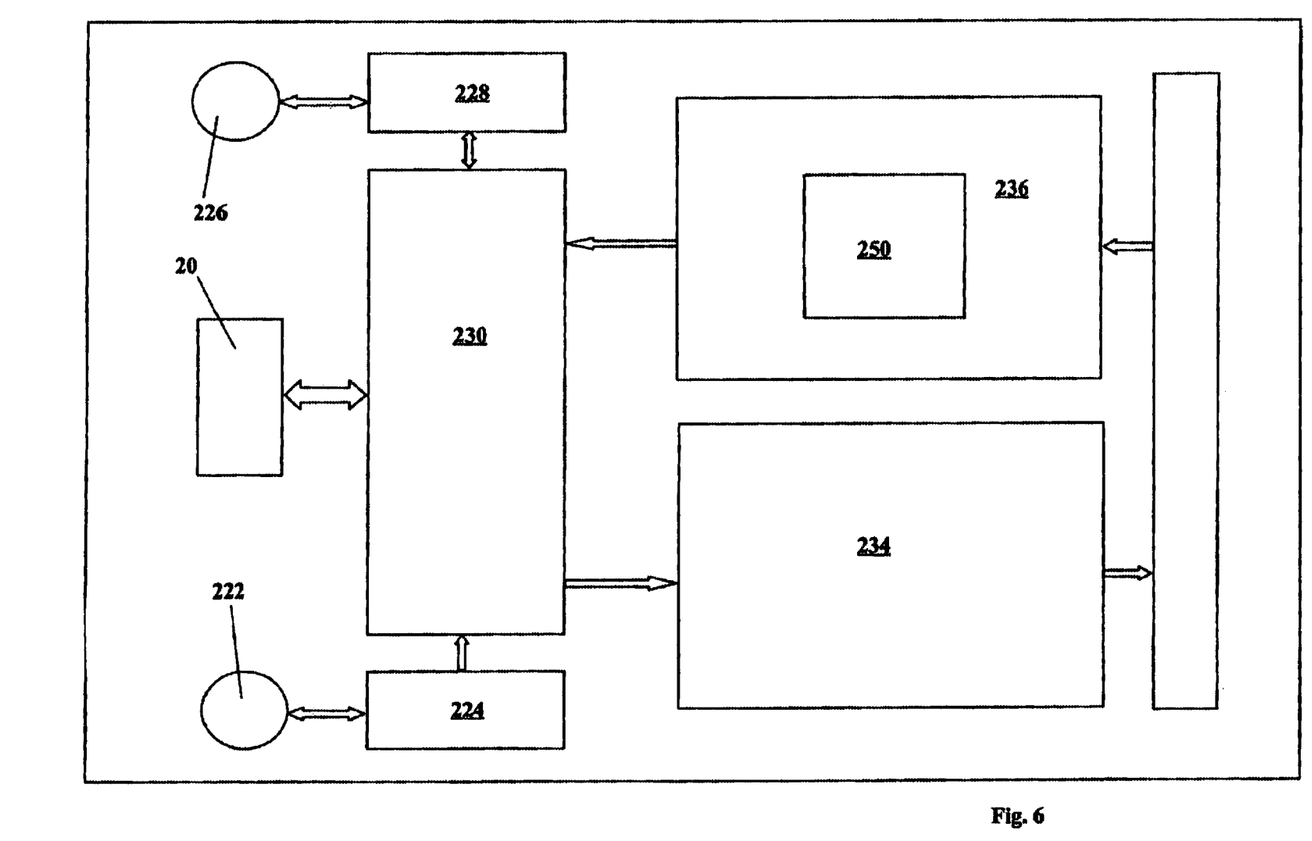
FIG. 6 is a schematic diagram of a formatter for the data.

The operation of the physical formatter 22 is shown in more detail in FIG. 6. The physical formatter 22 comprises the buffer 20, a write controller 222 controlling a write chain controller 224, and a read controller 226 controlling a read chain controller 228. The write chain controller and the read chain controller both interact with a function processing block 230, which generates the C1 and C2 parity bytes, sends data to a CCQ writer 234 for writing onto the tape channels, and receives data read from the tape channels by a CCQ reader 236. The physical formatter 22 is executed as hardware, with the exception of the write controller 222 and the read controller 226, which are firmware.

The write chain controller 224 operates the function block 230 to generate a CCP 26 from the data in the buffer 20 complete with C1 and C2 error correction information. The write chain controller 224 also generates the 10 header bytes 34, which are added by the function block 230.

The CCP 26 is then passed from the function block 230 to the CCQ writer 234, along with further information from the write chain controller 224, including whether it is the first or the second in a CQ set 38, and whether it should be preceded by a dataset separator DSS, and which channel (0 to 7) it should be written to.

The information in the header 34 is critical, and includes a designator of its position in the dataset matrix 24 (a number from 0 to 1023), a dataset number, a write pass number (to be explained in more detail below), an absolute CQ sequence number (all generated by the write chain controller 224), and two Reed Solomon header parity bytes, which are generated by the function block 230. These header parity bytes enable errors in the header 34 to be detected, but not necessarily corrected.

Figure 7:
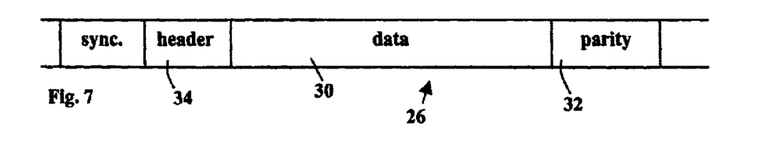
FIG. 7 shows more detail of data as written to tape.

The CCPs 26 passed to the CCQ writer 234 are allocated to a particular channel (0 to 7). Further processing adds synchronisation (sync) fields before each header 34 (see FIG. 7). This enables headers 34 to be recognised more easily when the data is read.

Figure 8:
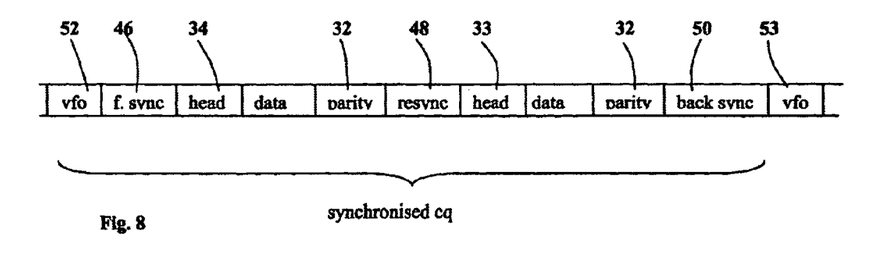
FIG. 8 shows further detail of data as written to tape.

As shown in FIG. 8 three separate sync fields are used: a forward sync 46, a resync 48 and a back sync 50. The forward sync 46 is positioned before the header 34 of the first CCP 26 of a CQ set 38. The resync 48 is positioned between the two CCPs 26 of a CQ set 38 (i.e. after the parity data 32 of the first CCP 26 and before the header 33 of the second CCP 26). The back sync 50 is positioned after the parity data 32 of the second codeword pair 26 within the CQ set 38.

The forward sync 46 is preceded by a VFO field 52 which comprises the data 000010 followed by a number of occurrences of the bit sequence 101010, The back sync field 50 is followed by a VFO field 53 that comprises the data 000010 followed by a number of occurrences of the bit sequence 101010. The VFO field 52 is easily detectable by the processing circuitry reading data from the tape 10, and alerts it to the fact a forward sync field 46 is to follow. The back sync 50 and VFO 53 are used in a similar way when the tape 10 is read backwards. The portion of the tape comprising a forward sync 46 to a back sync 50 comprises a synchronised CQ set 38. The headers 33, 34 contain information as to the identity of the data and the reading of the headers determines how the processing circuitry decodes the data. A DSS is put at the beginning of a dataset.

Figure 9:
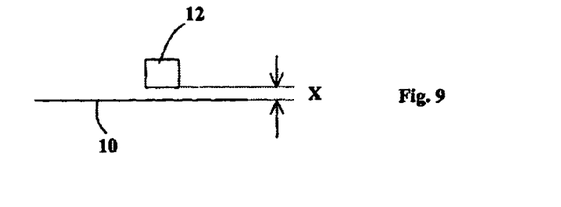
FIG. 9 shows schematically the position of a read head in relation to a tape.
Figure 10A:
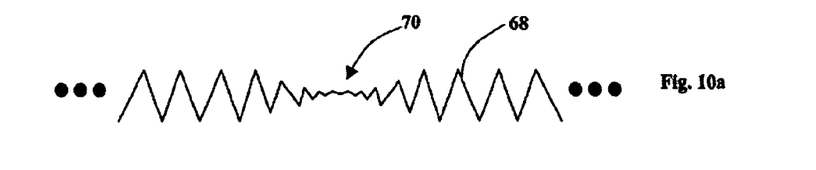
FIGS. 10a and b show schematically problems that may occur with a signal being read from a tape.

The dataset is then written to the tape 10 by the eight write heads 12 according to the channels (0 to 7) assigned by the write chain controller. When writing, the write pass number contained in the header 34 is of importance As can be seen in FIG. 9, when writing data, the physical separation X between the write heads 12 and tape 10 can vary. If the write head 12 moved away from the tape 10 when data was being written (i.e. X increased), then when that data is read back the signal strength at the point corresponding to the increase in X during writing will be much weaker. This is represented in FIG. 10a in which the signal 68 is weakened in the region 70. Such regions are referred to as regions of drop-out. The increased distance X can be caused by a number of factors, including the presence of dirt on the tape 10 and ripples in the tape 10.

Figure 10B:
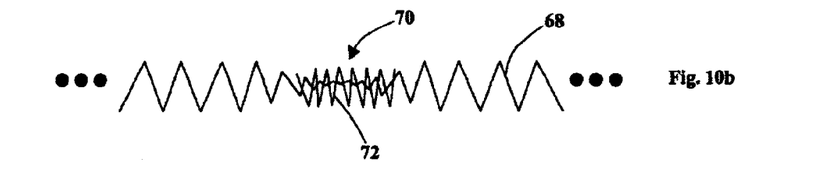

Whilst the tape 10 contains no information then a drop-out region 70 simply results in a loss of signal during reading, and would generate a read while writing retry (as explained below). However, if the tape 10 contained information that was being overwritten then because of the reduced field during writing the existing data would not be erased and would remain on the tape 10 and this is shown in FIG. 10; the new signal 68 is shown with a drop-out region 70 as in Figure 10a, but an existing signal 72 remains in this drop-out region. This existing signal is referred to a region of drop-in.

Drop-in regions must be accounted for during reading of information from the tape 10, and the write pass number described above is used to achieve this. All data that is written to the tape 10 is written with a write pass number, which for a particular tape is incremented each time data is written thereto. Consequently, a drop-in region of existing signal 72 will have a lower write pass number than the newer signal 68 that surrounds it. If the write pass drops during the middle of a dataset as data is being read from the tape 10, this indicates that a region of drop-in has been encountered. The current write pass number is held in the CCQ reader 236.

The data being written to the tape 10 is also read by the eight read heads. The data read is passed to the CCQ reader 236, where it is processed, as explained below, before being passed to the function block 230 for error detection and correction of errors, and for checking by the read chain controller 228. If the tape drive is in Read While Writing mode, the write chain controller 224 checks the CCPs to determine which CQ sets 38 are in error, and so need rewriting to the tape 10.

If the tape drive is in Reading mode, that is, for restoration of data, the CCPs 26 are passed to the buffer 20 to await sending back to the computer device 4.

The invention lies in the CCQ reader 236, which is arranged to detect and in particular to correct errors in the CCP headers 34 before the CCPs 26 are passed to the function block 230. This is advantageous, as it increases the number of CCPs 26 which can be used to recover data; if the header errors cannot be corrected the CCP 26 cannot be used and will require the CQ set to be rewritten (in RWW mode) or the data to be lost (in restoration mode). The CCQ reader 236 also looks at the write pass number of each CCP 26, enabling drop-ins to be filtered out by the CCQ reader 236. This ensures that the CCPs 26 passed to the function block 230 are as error-free as possible.

In general terms, the CCQ reader 236 gets a data signal from all the read heads, each head passing data through a separate channel (0 to 7). The CCQ reader 236 has a processing block 250 which looks for a VFO signal 52, followed by a forward sync 46, so that the header of a CCP 26 can be detected. Once a CCP 26 has been detected, it is processed in the block 250, including for each CCP a write pass check, and a header parity check, to establish any headers 34 that are in error.

The block 250 discards any CCPs 26 that are drop-ins, and corrects the headers 34 if possible. Then CCPs without header errors are multiplexed to the function block 230 for error correction and further processing.

In order to correct errors in the CCP headers 34, the CCQ reader 236 must identify CCPs 26 which have been written at the same time, as the headers 34 will contain similar information, so that information from the correct headers can be used to interpolate information into the incorrect headers. Because the write heads 12 may not be precisely aligned, CCPs written simultaneously will not arrive at the CCQ reader 236 on all channels simultaneously. It is then necessary to detect which were written at the same time, these being known as a CCP set.

Figure 11:
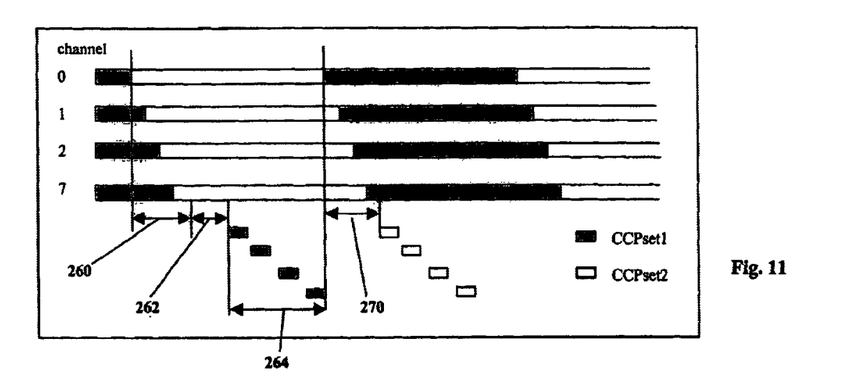
FIG. 11 is a schematic diagram showing how data is categorised as being written simultaneously.

CCP set detection is shown diagrammatically in FIG. 11. It is implemented in the processing block 250 by opening a time window 260 of a predetermined (but configurable) length, and all CCPs received within that time window 260 are marked as being within the same CCP set (CCPset 1); CCPs are placed in the window 260 if their 'end of CCP' is received in the window 260. The 'end of CCP' is defined as either 490 bytes received (2×240 byte codewords plus 10 byte header) or next forward sync 46 detected, and the processing of the previous CCP is finished. If the processing is still taking place, the CCP is discarded, and the next CCP on that channel overwrites it.

The window 260 is opened on receipt of the first 'end of CCP', regardless of which channel it comes from. Subsequent end of CCPs on the other channels are placed in that CCP set, until the window 260 closes. The next 'end of CCP' received (on whichever channel) will open the next CCP window 270 (see FIG. 11). FIG. 11 shows four channels, (0, 1, 2 and 7). The window 260 is opened by the 'end of CCP' received on channel 0, and the CCPs received on channels 1, 2 and 7 all fall within the window 260 and are deemed to be in the same CCP set. A further time period 262 is allowed for the processing of the CCP set in the block 250, and then another time period 264 to send the CCPs to the function block 230. The sum of the time periods 260, 262 and 264 is equal to or less than the time it takes to receive a CCP set in the processing block 250.

The next window 270 is opened by the 'end of CCP' received next. In FIG. 11, this is shown as channel 0 again, While a CCP set is being processed, if any further 'end of CCPs' are unexpectedly received, they will be ignored. Such 'end of CCPs' will normally be drop-ins, so that ignoring them is correct. It is also possible for the CCP set window 260 to be triggered by a drop-in, so that the unexpectedly received CCPs are in fact correct data, which are then ignored. However, as the use of the CCP set window will re-synchronise the CCPs quickly, very little will be lost.

Alternatively, if another 'end of CCP' is received while a CCP set is being processed, a queuing window 280 will be opened for a given time period. This will normally be set to be the length of the CCP set window 260, or until processing of the first CCP set is completed, and those CCPs have been sent to the function block 230, whichever is longer.

Figure 12A:
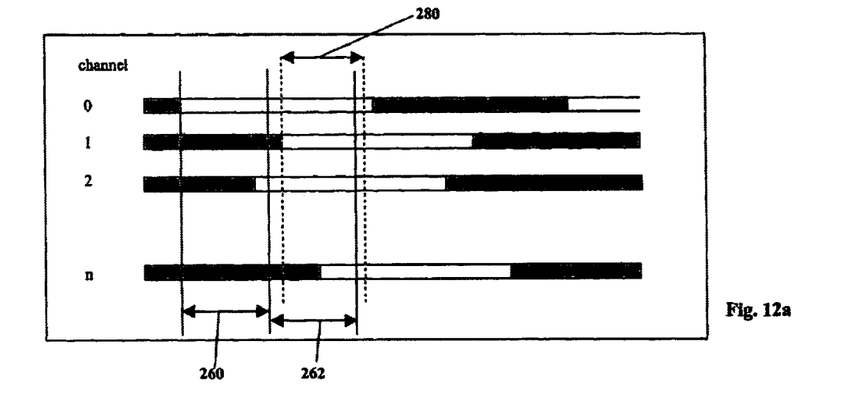
FIGS. 12a and b show a modification of FIG. 11.

FIG. 12*a* shows the first case, where the processing of CCPset1 finishes within the length of the window 260, so that the queuing window 280 is the same length as the window 260.

Figure 12B:
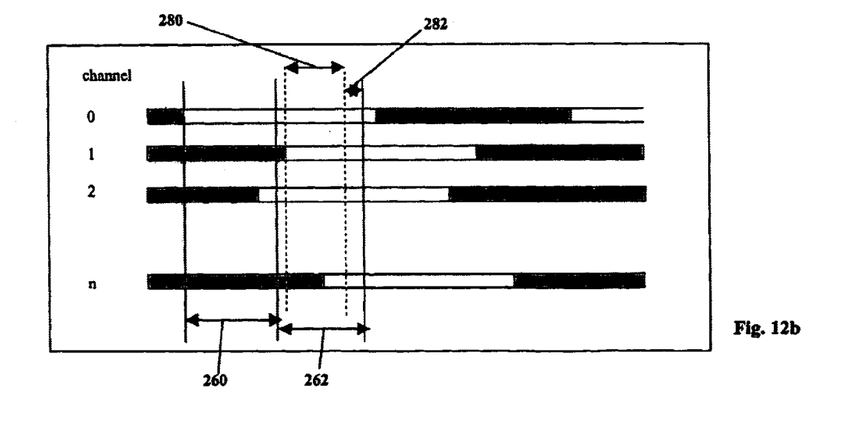

FIG. 12*b* shows the second case, where CCPset1 is still being processed when the queuing window 280 has been open for a time equal to the length of the CCP set window 260, Here the queuing window 280 is extended, by a period 282, and remains open until processing of the CCP set 1 has finished.

In either case, the CCPs which arrive in that queuing window 280 will then be processed as a CCP set, and if any further 'end of CCPs' arrive while that processing is taking place they will open a new queuing window. Only one window 260 or 280 will be open at a time, and only one CCP set will be processed at a time.

The use of the queuing window 280 ensures that a minimum amount of data is lost.

The length of the CCP set window 260 is set to approximately the time it takes to receive approximately 100 bits. This should accommodate the maximum misalignment of the write heads 12. The length of the window 260 can be changed if necessary.

As shown in FIG. 6, the processing on the CCP sets is performed by hardware. In a modification (not shown) the CCQ reader 236 can be configured to generate an interrupt when a CCP set window 260 is closed. The processing on the CCP set can then be performed by firmware.

We claim:

1. A data reader arranged to read data including user data and non-user data written across at least two parallel tracks of a data-holding medium, said data being arranged fnto a plurality of data items each including user data and non-user data, with said non-user data holding information relating to said user data, said data reader comprising a read head for reading a respective one of each of said tracks of said data-holding medium to generate a data signal comprising said data items, and processing circuitry arranged to receive and process said data signals to identify a set including a plurality of said data items written at the same time onto different ones of said tracks.

2. A data reader according to claim 1, wherein said processing circuitry defines a predetermined time period, such that all data items received within said time period are identified as being in a set.

3. A data reader according to claim 2, wherein said time period can be varied.

4. A data reader according to claim 1, wherein said processing circuitry identifies a set of data items by determining when a predetermined point in each said data item is received.

5. A data reader according to claim 2, wherein said processing circuitry determines the start of each time period by receipt of a predetermined point of a single data item or at least two data items received simultaneously.

6. A data reader according to claim 4, wherein said predetermined point is the end of a said data item.

7. A data reader according to claim 5, wherein a said data item is received from a predetermined track.

8. A data reader according to claim 5, wherein at least one of said data item is the first data item to be received from any of the said tracks, or the first data items to be received simultaneously from any of the said tracks.

9. A data reader according to claim 2, wherein the end of a given said time period is determined by the time taken to receive a data item.

10. A data reader according to claim 2, wherein the end of a given said time period is determined by receipt of the start of another data item.

11. A data reader according to claim 1, wherein a set of data items includes data items from some or all of said tracks.

12. A data reader according to claim 1, wherein a set of data items includes no more than one data item from any said track.

13. A data storage device incorporating a data reader according to claim 1.

14. A method of reading data including user data and non-user data written across at least two parallel tracks of a data-holding medium, said data being arranged into a plurality of data items each including user data and non-user data, with said non-user data holding information relating to said user data, said method comprising:
   reading each of said tracks of said data-holding medium;
   generating a data signal comprising said data items for each track; and
   processing said data signals the processing including identifying a set including a plurality of said data items written at the same time onto different ones of said tracks.

15. A method according to claim 14, wherein said step of processing said data signals includes defining a time period, such that all data items received within said time period are identified as a set.

16. A method according to claim 14, wherein said step of processing said data signals includes identifying a predetermined point in a data item, to determine when it is received.

17. A method according to claim 15, wherein said step of processing said data signals includes identifying the start of each time period by receipt of a predetermined point of a single data item from any given track, or of at least two data items simultaneously from different tracks.

18. A method according to claim 16, wherein said predetermined point is the end of a said data item.

19. A method according to claim 15, wherein said step of processing said data signals also includes determining the end of said time period by the time taken to receive a data item, or the receipt of the start of another data item.

20. A computer readable medium having stored therein instructions for causing a processing unit to execute the method of claim 14.

21. Apparatus for processing data respectively written as N data items in N parallel tracks of a data storage medium, a different one of the N data items in the N tracks being at each of M multiple discrete locations along the medium, where N is greater than 1 and M is greater than 1, each of the data items including multiple user bytes and multiple non-user bytes relating to the user bytes of the item, the apparatus comprising:
   a reader for said user and non-user data bytes in the N tracks at the discrete locations, and
   a processor for processing the read data bytes, the processor being arranged for identifying and grouping together the N data items simultaneously written into the medium at the discrete positions.

22. A method of processing data respectively written as N data items into N parallel tracks of a data storage medium so that at each discrete position, k, along the medium there are N data items in the N tracks, where N is greater than 1 and k is every integer from 1 to M, each of the data items including multiple user bytes and multiple non-user bytes relating to the user bytes of the item, the method comprising:
   reading said user and non-user data bytes in the N tracks at at least some of the discrete positions, and
   processing the read data bytes, the processing step including identifying and grouping together the N data items simultaneously written into the medium at at least some of the discrete positions.

23. A method of processing data comprising:
   simultaneously writing N data items into N parallel tracks of a data storage medium during each of M multiple successive time intervals so that at each discrete position, k, along the medium there are N data items in the N tracks, where N is greater than 1 and k is every integer from 1 to M, each of the data items including multiple user bytes and multiple non-user bytes relating to the user bytes of the item,
   reading said user and non-user data bytes in the N tracks at at least some of the discrete positions, and
   processing the read data bytes, the processing step including identifying and grouping together the N data items simultaneously written into the medium at at least some of the discrete positions.

24. The method of claim 23 wherein the multiple non-user bytes in each data item include a header, the header including information about the location on the medium of the data item including the header relative to the location of another data item on the medium, the header including no information about the time or relative time the data item including the header was written on the medium.

25. The method of claim 24 wherein the multiple non-user bytes in each data item includes parity bytes.

* * * * *